United States Patent
Wetzels et al.

(10) Patent No.: US 8,267,465 B2
(45) Date of Patent: Sep. 18, 2012

(54) REINFORCING PART FOR AN AIR-GUIDING DEVICE OF A MOTOR VEHICLE

(75) Inventors: Ralf Wetzels, Huckeswagen (DE); Harald Weber, Wetzlar (DE); Mehrdad Shahgohli, Giessen (DE)

(73) Assignee: TB & C Outsert Center GmbH, Herborn (DE)

( * ) Notice: Subject to any disclaimer, the term of this patent is extended or adjusted under 35 U.S.C. 154(b) by 139 days.

(21) Appl. No.: 12/820,373

(22) Filed: Jun. 22, 2010

(65) Prior Publication Data

US 2010/0327624 A1 Dec. 30, 2010

(30) Foreign Application Priority Data

Jun. 25, 2009 (EP) .................................... 09008298

(51) Int. Cl.
*B60J 7/22* (2006.01)
*B60J 1/20* (2006.01)

(52) U.S. Cl. ................. 296/180.1; 296/216.06; 296/217

(58) Field of Classification Search ............... 296/180.1, 296/216.06, 216.07, 216.09, 217; 72/367.1, 72/370.04
See application file for complete search history.

(56) References Cited

U.S. PATENT DOCUMENTS

| 5,540,016 | A | * | 7/1996 | Clausen | 52/98 |
|---|---|---|---|---|---|
| 5,660,429 | A | * | 8/1997 | Wienchol | 296/217 |
| 5,749,135 | A | * | 5/1998 | Crane et al. | 29/415 |
| 6,666,503 | B1 | * | 12/2003 | Sorensen | 296/217 |
| 2003/0168892 | A1 | * | 9/2003 | Bohm et al. | 296/217 |
| 2004/0189057 | A1 | * | 9/2004 | Grimm et al. | 296/217 |
| 2005/0258669 | A1 | * | 11/2005 | Manders | 296/217 |
| 2007/0096509 | A1 | * | 5/2007 | Johannes Manders | 296/217 |
| 2007/0222260 | A1 | * | 9/2007 | Pocchiola | 296/217 |
| 2008/0129088 | A1 | * | 6/2008 | Spickermann et al. | 296/217 |
| 2008/0246306 | A1 | * | 10/2008 | Oerke et al. | 296/180.1 |
| 2008/0284211 | A1 | * | 11/2008 | Oerke et al. | 296/217 |

FOREIGN PATENT DOCUMENTS

| DE | 10210142 A1 | 9/2003 |
|---|---|---|
| DE | 102007051878 A1 | 5/2009 |
| EP | 1977923 A2 | 3/2008 |

OTHER PUBLICATIONS

European Patent Office, Office Action for European Patent Application No. EP 09 00 8298, dated Oct. 16, 2009 (1 page).

* cited by examiner

*Primary Examiner* — Dennis Pedder
*Assistant Examiner* — Jason Daniels
(74) *Attorney, Agent, or Firm* — Price Heneveld LLP

(57) ABSTRACT

A structural reinforcing member for motor vehicle wind deflectors has a shaped configuration with at least one curved portion, and a plurality of mutually spaced apart, plastically formed deformation sections which provide structural rigidity to maintain the shaped configuration and geometry of the reinforcing member.

12 Claims, 5 Drawing Sheets

REINFORCING PART FOR AN AIR-GUIDING DEVICE OF A MOTOR VEHICLE

CLAIM OF PRIORITY

Applicants hereby claim the priority benefits under the provisions of 35 U.S.C. §119, basing said claim of priority on European Patent Application Serial No. 09 008 298.3, filed Jun. 25, 2009. In accordance with the provisions of 35 U.S.C. §119 and Rule 55(b), a certified copy of the above-listed European patent application will be filed before grant of a patent.

BACKGROUND OF THE INVENTION

The present invention relates to a structural reinforcing part for an air deflection device on a motor vehicle, a corresponding air deflection device and a method for the production of a shaped structural reinforcing part.

Air deflection devices are typically used as wind deflectors or wind blockers in the motor vehicle sector. In conjunction with a sliding roof system, they perform the function, especially when the sliding roof is open, of suppressing or preventing any troublesome noise caused by periodic changes in air pressure, which is perceptible as booming within the vehicle. For this purpose, a wind deflector should generally be arranged in the region of the front edge of a sliding roof aperture in the direction of travel of the vehicle.

When the sliding roof is open, a movably mounted extender portion of the wind deflector moves into a use or extended position, in which it is raised relative to a home position. Raising the extender stretches an air-permeable surface element between the extender and a base part, which is typically fixed on the vehicle. If the vehicle is in motion, extending the surface element leads to a deliberate local swirling of the air, which is an effective means of counteracting the occurrence of audible fluctuations in air pressure.

A wind deflector known per se is disclosed by DE 102 10 142 A1, for example. This wind deflector has an extender connected pivotably to a base element, and an air-permeable and flexible deflector element being arranged on the base element and on the extender. Also provided is an extender spring, which pushes the extender into an extended position when the sliding roof is open, in which position, the deflector element is stretched between the base part and the extender. In this arrangement, the deflector element is preferably secured on the base element and/or on the extender by means of an injection-molding process.

A wire leg spring, which functions as an extender spring and serves as a hinge between the extender and the base part, is furthermore provided. The legs of the leg spring can be inserted into the base element and the extender and can be latched there mechanically. It is furthermore possible to insert the leg spring into the mold for the base element and the extender, and injection-mold it directly into place in situ.

It is necessary in terms of production engineering to secure or fix the deflector element on the extender or base part before the extender or base part is molded on or encapsulated in plastic. For this purpose, a shaped, structural reinforcing part is typically provided for the extender and/or the base part, and is typically in the form of a metal hoop, on which the deflector element is secured before the metal hoop is encapsulated.

It has proven disadvantageous that the metal hoop to be encapsulated in the injection-molding process has relatively large component tolerances, owing to the way in which it is produced. When the metal hoop to be encapsulated is inserted into an injection mold, this can lead to the metal hoop being subject to elastic deformation in bending, at least in a certain area or areas. Immediately after the injection-molding operation, in the course of which the metal hoop is encapsulated with a thermoplastic elastomer for example, restoring forces associated with bending elasticity can emerge in the encapsulated metal hoop, and these can lead to deformation of the extender or the base part encapsulated within plastic.

In addition, there is the risk that the wall thickness of the plastic encapsulation will vary locally from one area to another, owing to restoring forces associated with bending elasticity in the metal hoop insert. It may also happen that the metal insert to be encapsulated will rest against the inside of the injection mold during the injection-molding process, with the result being that areas of the metal insert will emerge visibly in the encapsulating plastic layer after the injection-molding process is complete.

SUMMARY OF THE INVENTION

It is therefore one object of the present invention to provide a shaped structural reinforcing part for an air deflection device on a motor vehicle which has better dimensional accuracy and smaller production tolerances in comparison with the prior art. At the same time, it should be possible to produce the shaped part economically, especially in an industrial mass production process. It is also an aim of the invention to provide an air deflection device, e.g., a wind deflector or a wind blocker, with a structure-reinforcing insert encapsulated with plastic, with the encapsulated plastic layer conforming as accurately as possible dimensionally to predetermined wall thicknesses. It is a further aim of the invention to optimize the production of a wind deflector or wind blocker from the point of view of rationality of production and cost saving.

One object underlying the invention is achieved with the aid of a shaped structural reinforcing part in accordance with independent patent claim 1, an air deflection device in accordance with independent patent claim 12 and with the aid of a method for the production of a shaped part. Individual advantageous embodiments of the invention are specified in the respective dependent patent claims.

The shaped structural reinforcing part according to the present invention is designed for an air deflection device on a motor vehicle, in particular for a wind deflector or for a wind blocker. The shaped part has a shape that is curved in a certain area or areas. For example, it can have a substantially U-shaped external contour with two lateral limbs and a central section connecting the limbs. To ensure compliance with predetermined geometrical dimensions and external contours and/or compliance with predetermined geometrical tolerances, the shaped part has a multiplicity of mutually spaced deformation sections, each of which can be produced by means of local plastic deformations of the shaped part.

Accordingly, the structure-reinforcing shaped part is the subject of one or more plastic deformation processes, in the course of which a plurality of plastically deformed deformation sections are introduced into the external contour of the shaped part. It is thereby possible to equalize the restoring forces associated with bending elasticity that are inherent in the shaped part, thereby making it possible to provide a required dimensional accuracy through plastic deformation of the shaped part in a certain area or areas.

The individual, mutually spaced deformation sections, which are arranged in a manner distributed over the outer circumference and/or over the longitudinal extent of the shaped part, leave the basic geometry of the shaped part substantially unaltered. The geometrical dimensions of a deformation section are furthermore relatively small compared to the outside dimensions of the shaped part and/or of its diameter.

According to a preferred embodiment of the present invention, provision is made, in particular, in the local plastically deformed deformation sections for the reduction of restoring forces caused by bending or curving the shaped part in a certain area or areas to be introduced into the shaped part by means of a stamping process. The shaped part is therefore the subject of a stamping process, in the course of which the plastic deformation sections to be provided for the purpose of equalizing and compensating for any elastic restoring forces that would otherwise be present are to be introduced into the shaped part. The stamping tool has a pressing die corresponding to the shape of the shaped part. Depending on the configuration and number of individual pressing dies or pressing punches, female die parts and male die parts, the shaped structural reinforcing part can be deformed plastically in all three spatial directions in a certain area or areas in the course of the stamping process to give the required dimensional accuracy, and to comply with very small predetermined geometrical tolerances.

By introducing the plastic deformation sections described, the elastic deformations in bending, which otherwise occur in the shaped part due to insertion into an injection mold for example, and the associated elastic restoring forces can be equalized, compensated and dissipated from the shaped part.

According to another advantageous embodiment of the present invention, provision is made for the shaped part to have, in a central section which extends substantially in a straight line, at least in a certain area or areas, plastically deformed deformation sections designed as beads, which extend substantially perpendicularly or obliquely to the longitudinal extent of the central section. By introducing such stamped locations extending obliquely or perpendicularly to the central section, any bending moments perpendicular or oblique with respect to the longitudinal extent of the central section can be substantially equalized or compensated.

According to another embodiment of the present invention, provision is made for the central section of the shaped part to merge via a curved section into a respective lateral limb, which extends obliquely or perpendicularly to the longitudinal extent of the central section. The transition from the central section to the lateral limb is preferably of a one-piece design. In particular, provision can be made for the central section and the lateral limbs to be formed by a bending process, starting from a metal hoop blank which originally extends substantially in a straight line.

It is advantageous that uniformly plastically deformed deformation sections are made precisely in the curved section which connects the lateral limbs and the central section of the shaped part to one another. The deformation sections in the region of the curved section of the shaped part can be matched to the shape of the curved section and be designed to follow the latter.

It is advantageous that the shaped part has a curved section merging integrally into a respective lateral limb on both sides of its central section extending substantially in a straight line. The two lateral limbs are preferably aligned parallel to one another. The shaped part thus has a substantially U-shaped profile with two lateral limbs and a central section connecting the two lateral limbs integrally to one another.

According to another preferred embodiment of the present invention, provision is made for the shaped part to be designed at least in a certain area or areas as a closed hollow profile or as a tube. The shaped part can be manufactured from a blank in the form of a hollow profile or tube, which is first converted to a substantially U-shaped configuration in the course of a bending process, and is then brought to the required dimensional accuracy in the course of the stamping process according to the present invention.

According to another advantageous aspect of the present invention, provision is made for the shaped part to have a cross-sectional profile, which deviates from a circular profile, at least in a certain section or sections, preferably in the region of the curved section. In this context, provision is made for at least one bead, which follows the curved section or extends in the longitudinal direction of the curved section, and/or a stamped feature, which extends in the longitudinal direction of the curved section, to be introduced in the course of the stamping process according to the invention, with the result that the curved section has a substantially constant or uniform cross-sectional profile all along its curvature.

According to another embodiment of the present invention, provision is made for plastically deformed deformation sections to be introduced into the shaped part not only for alignment and for the purpose of complying with required tolerances, but also for the purpose of adapting the shaped part to predetermined cross-sectional geometries.

For example, design specifications for the air deflection device may require that the shaped part have areas of varying thickness and varying cross section along its longitudinal extent. Shaping of this kind, which deviates in each case from an initial workpiece, can be introduced into the shaped part by means of a single plastic deformation process. It proves advantageous here if the shaped part is internally hollow, at least in a certain area or areas, so that in the case of a round initial workpiece, it is relatively easy to introduce into the workpiece and the shaped part, resulting therefrom stamped features which are distributed over the circumference and extend in the longitudinal direction of the workpiece, by means of a radially inward stamping process.

Moreover, a stamped feature of this kind proves advantageous inasmuch as it eliminates the need to introduce further plastically deformed deformation sections, in the form of individual local beads for example, into a shaped-part section stamped in this way.

In addition, provision can be made, in accordance with the present invention, for each of the free ends of the lateral limbs, which simultaneously form free ends of the shaped structural reinforcing part, to be designed to hold a leg of a leg spring by means of non-positive engagement and/or by a clamp. The stamping process provided for dimensionally accurate shaping of the shaped part can thus also be used to fasten a leg spring on the shaped part. It is thus advantageously possible to eliminate the need for a separate process to mount the leg spring on the shaped part.

Moreover, provision is made, in accordance with the present invention, for the lateral limb to have, facing an adjoining curved section, a lateral insertion opening to receive an auxiliary spring which assists an adjustment motion of the air deflection device. This lateral insertion opening can be punched out of the lateral limb in the course of the stamping process, and be provided for the purpose of aligning the shaped part. It is thus likewise possible to integrate a discrete and separate process of introducing an insertion opening for an auxiliary spring into the stamping process that aligns the shaped part.

According to a development of the present invention, provision is made for the deformation sections, which are introduced into the central section in the course of the aligning stamping process, and which come to lie adjacent to one another in the longitudinal direction of the central section, to be arranged offset relative to one another, as viewed in the circumferential direction of the shaped part. In particular, provision is made for the plastically deformed deformation sections, which are of bead-type design, to be stamped into the central section by turns, and in alternation, on different sides, as viewed in the longitudinal direction of the central section. It is also possible for individual deformation sections to be introduced alternately from above, from below and from the left or from the right into the central section, relative to the cross section thereof. It is furthermore conceivable that deformation sections, which come to lie adjacent to one another in the longitudinal direction, could be arranged offset relative to one another, in each case by a predetermined angle, e.g., by 30 degrees, 45 degrees, 60 degrees or even up to 180 degrees, in each case as viewed in the circumferential direction of the shaped part.

According to another embodiment of the invention, provision is made for at least two deformation sections, which are aligned substantially perpendicular to one another and lie in the cross-sectional plane of the central section to virtually or directly adjoin one another in the circumferential direction. Thus, provision can be made to provide a bead extending in the cross-sectional plane of the central section from above and to provide a corresponding bead laterally with respect thereto. Longitudinally adjacent thereto, provision can be made to introduce corresponding beads into the central section from below and from the left-hand side in a different cross-sectional plane. The beads introduced into the central section in a common cross-sectional plane preferably extend at an angle, especially substantially at a right angle, to one another.

According to another advantageous aspect of the present invention, provision is made for the invention wherein the shaped part is manufactured as a tubular metal blank made of steel, aluminum, brass or similar materials having a corresponding dimensional rigidity.

According to another independent aspect, the invention relates to an air deflection device for a motor vehicle, in particular to a wind deflector or a wind blocker, having a base part and/or an extender, which, in the case where the air deflection device is configured as a wind deflector, are connected pivotally to one another and stretch a flexible surface element between them. The base part and/or the extender have a shaped part according to the invention which is encapsulated with plastic, at least in a certain area or areas.

In the case of the embodiment as a wind blocker, it is possible, in contrast to the case of a wind deflector, for just the base part or the extender to be provided, for example, which is then in each case provided with a substantially rectangular or trapezoidal shaped part, the latter preferably being continuous in the circumferential direction, to which the flexible surface element is pre-fixed before an injection-molding process and is connected to the encapsulated base part in the course of an injection-molding process.

According to another advantageous aspect of the present invention, provision is made for the surface element to be connected to the shaped part by positive and/or non-positive engagement. For this purpose, individual retention clips are provided, by means of which the surface element can be fixed on the base part and/or on the extender, at least for the duration of the injection-molding process.

According to another advantageous aspect of the present invention, provision is made for the auxiliary spring, which can be inserted into a lateral insertion opening in the shaped part and can be inserted at a distance from the pivoting axis of the base part and/or the extender, to be secured on the extender and/or on the base part by encapsulating the shaped part with plastic. Once the stamping process is complete, an insertion opening, which is introduced into the shaped part in the course of the aligning stamping process, can serve to accommodate and pre-fix the auxiliary spring, which can then be surrounded by plastic in a subsequent injection-molding process, and in this way, embedded in the extender and/or the base part and secured permanently on these components of the air deflection device.

According to another independent aspect, the present invention relates to an air deflection device for a motor vehicle, having a base part and an extender mounted in a manner which allows it to be pivoted relative to the base part, and having a surface element which can be stretched between the base part and the extender. In this case, provision is furthermore made for an extender spring, which functions as a hinge joint for the base part and the extender and is designed to urge or move the extender relative to the base part into an extended or raised position. In addition to the extender spring, which can preferably be designed as a leg spring made of wire, a further auxiliary spring is provided, which is arranged at a distance from the pivoting axis of the extender and the base part. Here, the auxiliary spring fulfills the purpose of initiating an initial opening movement of the extender and intensifying the force created by the leg spring.

In particular, provision is made here for the auxiliary spring to be secured on a lateral limb of the extender and/or base part, being arranged pivotally thereon for example. In particular, provision is made for the auxiliary spring to be arranged directly adjacent to a central section or curved section connecting the two lateral limbs of the extender and/or base part. At the very least, however, it has proven advantageous that the distance between the auxiliary spring and the central section is less than the distance between the auxiliary spring and the leg spring or pivoting axis. By arranging the auxiliary spring at a distance from the pivoting axis of the base part and the extender, it is possible to make advantageous use of a lever effect relative to the pivoting axis. With a greater selected distance between the auxiliary spring and the pivoting axis, it is possible to use a weaker auxiliary spring.

According to another independent aspect, the present invention relates to a motor vehicle having an air deflection device according to the invention designed as a wind deflector or wind blocker.

According to another independent aspect, the present invention furthermore relates to a method for the production of a shaped part, wherein a tubular blank, preferably designed as a closed hollow profile made from plastically deformable material, preferably a plastically deformable metal such as steel, aluminum or brass, is first bent into a predetermined shape and is then deformed plastically by means of a stamping process at a multiplicity of mutually spaced deformation sections in order to ensure an accurately fitting geometrical configuration and/or compliance with predetermined geometrical tolerances.

It is advantageous if the plastically deformed deformation sections are introduced into the blank by means of individual stamping pins arranged in a manner distributed both over the circumference and also along the blank. Accordingly, the stamping tool, the stamping die and/or the stamping punch have in a certain section or sections appropriately designed stamping pins which, as the stamping tool is fed in, are pressed into the shaped part at least by an amount which is just enough to ensure that the elastic limit thereof is exceeded, thus giving rise to a desired plastically deformed deformation section, in accordance with the intended purpose.

The provision of individual stamped locations which come to lie in a manner distributed along the blank proves advantageous over a stamping process which involves deforming the blank continuously over its longitudinal extent inasmuch as the blank has to be provided with individual plastically deformed deformation sections, in the form of beads for example, only in a certain area or areas and locally, and the feed forces that have to be produced to generate the said sections are lower in comparison. Moreover, the stamping tool required for this purpose can be of a correspondingly economical design.

In addition, provision can be made for the shaped part or the corresponding initial workpiece to be altered, at least in a certain area or areas in regards its external dimensions and its cross-sectional geometry, by a stamping process in order to meet the design requirements imposed on the air deflection device. If, for instance, the extender or the base part of a wind deflector is to have a diameter of, for example, 10.0 millimeters in a certain area or areas, the outside diameter of an initial workpiece for the shaped part will already be about 8.0 millimeters, and if the shaped part for the creation of the extender or base part is to be coated with a layer of plastic that is at least 1.5 to 2.5 millimeters thick, the shaped part must be reduced in terms of its outside diameter in this partial area with the aid of the stamping process which aligns the component.

If such a stamping operation takes place, reducing the diameter of the shaped part, it is advantageously possible to dispense with the introduction of further plastically deformed beads in this area.

ILLUSTRATIVE EMBODIMENTS

Further aims, features and advantageous embodiments of the present invention are explained by the following description of illustrative embodiments with reference to the figures. In this context, all the features, both those that are described and those that are depicted in the figures, whether singly or in any reasonable combination, form the subject matter of the present invention.

BRIEF DESCRIPTION OF THE DRAWINGS

FIG. 5 shows a perspective representation of a shaped structural reinforcing part embedded in the extender of the wind deflector shown in FIGS. 1 and 3.

FIG. 5a shows an enlarged portion of the shaped part in the region of a curved section.

FIG. 5b shows a cross section through a lateral limb of the shaped part along a section A-A in FIG. 5a.

DETAILED DESCRIPTION OF THE PREFERRED EMBODIMENTS

Figures 1, 2:
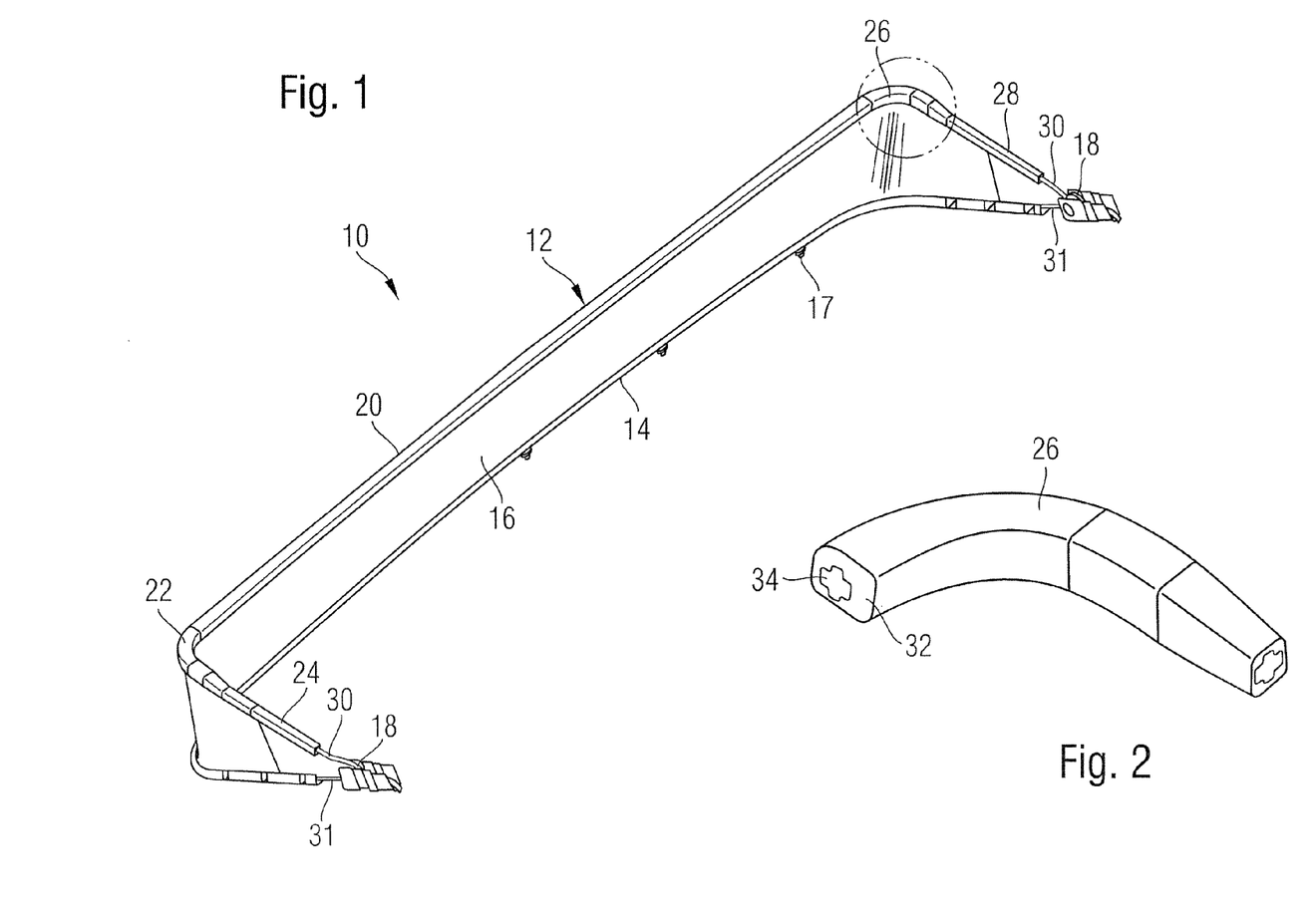
FIG. 1 shows a wind deflector in accordance with the present invention in a perspective view.
FIG. 2 shows an enlarged representation of a portion of the extender in the transitional region between the central section and the lateral limb.

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figures 3, 4:
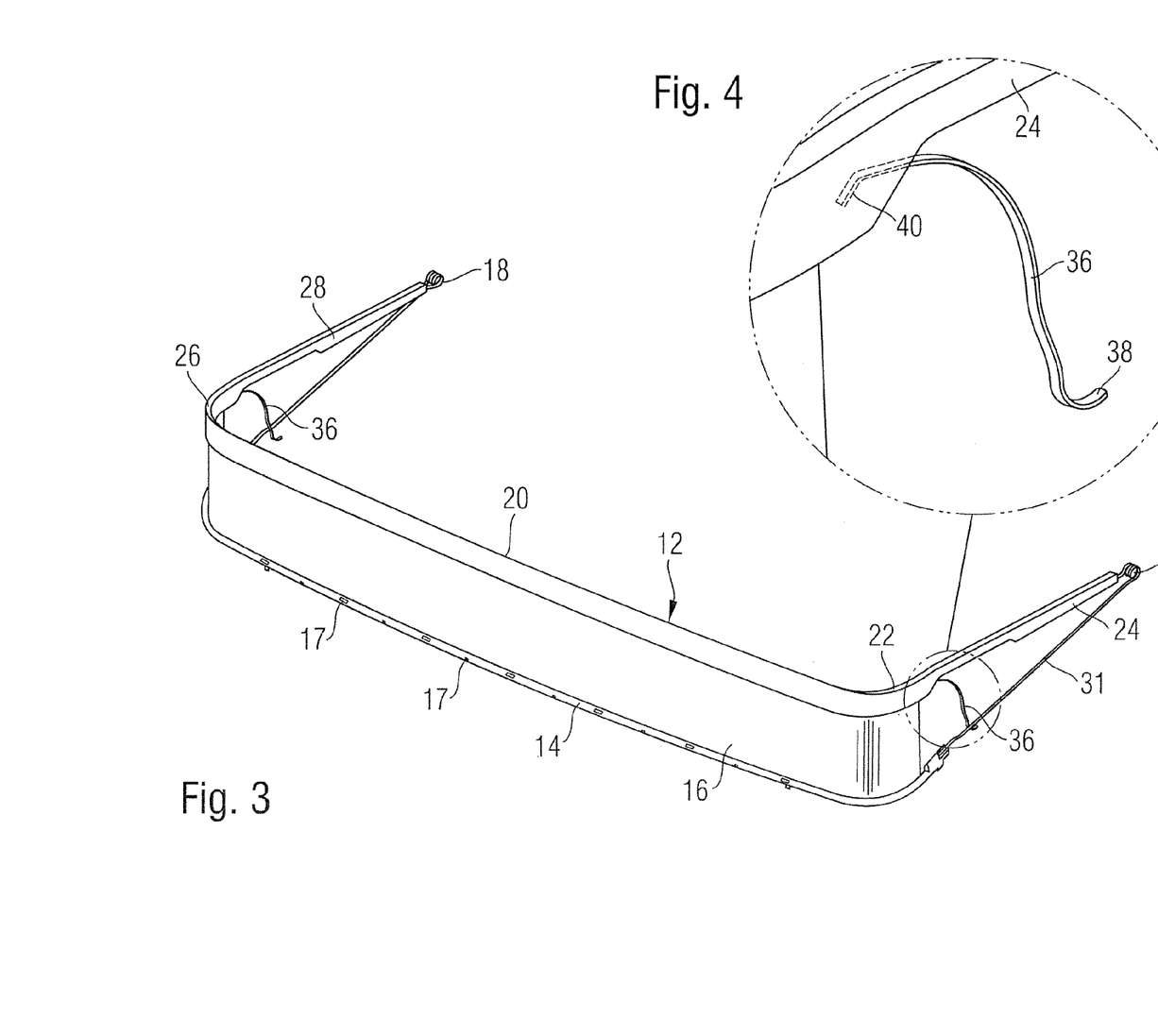
FIG. 3 shows a perspective representation of a further embodiment of a wind deflector with an auxiliary spring.
FIG. 4 shows an enlarged representation of the auxiliary spring shown in FIG. 3.
Figures 5, 5A, 5B:
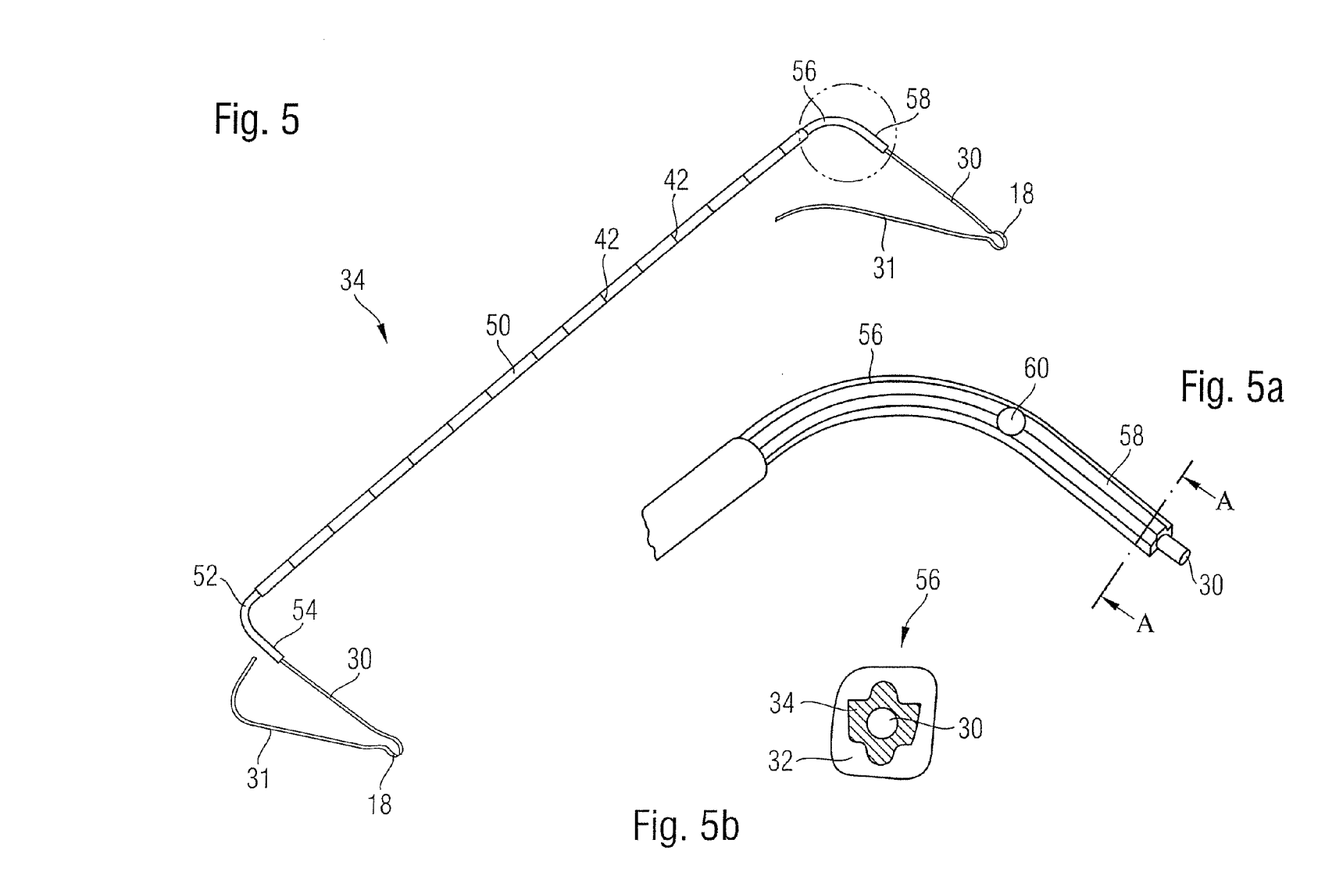

FIGS. 1 and 3 show a wind deflector 10, which has a surface element 16 having a first portion embedded in an extender 12, which can be raised, and a second portion embedded in a base part 14. The base part 14 and/or the extender 12 are designed as an injection molding that is structurally reinforced by a metal insert 34. In the production process, the surface element 16, which has an air-permeable and flexible design and can be designed as a knitted textile fabric, woven fabric, or as an open-mesh fabric or non-woven for example, is first secured on the shaped part 34 which, in FIG. 5, is shown separately in the form of an extender and functions as an insert. In the course of an injection-molding process, in which virtually the entire shaped part 34 is preferably enclosed by a thermoplastic compound 32, the surface element 16 is then secured permanently on the extender 12 and/or base part 14 formed in this way.

As illustrated in FIGS. 1 and 3, the base part 14 and the extender 12 are connected pivotally to one another by way of a hinge 18. The pivot joint is formed directly by means of a leg spring 18, as can be seen particularly in FIG. 3, with at least one spring leg 30 being embedded in the plastic-encapsulated extender 12. As is made clear in FIG. 3, the other spring leg 31 can serve directly as the base part 14, on which the surface element 16 is secured by means of individual fastening elements 17.

The extender 12 and the base part 14 have a substantially congruent external geometry in the form of a "U". For example, the extender 12 has a central section 20, which extends substantially in a straight line, and two adjoining lateral limbs 24, 28, which merge via a respective curved section 22, 26 into the central piece 20.

The extender 12 illustrated in FIG. 1 is almost completely embedded in a plastic sheath 32, as is apparent from the enlarged, partially sectioned representation of the curved section 26 in FIGS. 2 and 5b. The extender 12 also has a shaped structural reinforcing part 34, which functions as a metal insert and is completely enclosed in the circumferential direction by the plastic sheath 32 in the course of the injection-molding process. In the areas shown in FIGS. 2 and 5b, the shaped part 34 deviates from its otherwise circular cross section. In order to comply with predetermined design requirements and reduce its outside diameter, individual deformations, which extend in the longitudinal direction of the shaped part and are oriented radially inwards, are stamped into the shaped part, leading ultimately to the shaped part 34 having a cross-sectional geometry reminiscent of a cloverleaf approximately in the area of the curved sections 52, 56.

Corresponding to the geometry of the extender 12, the shaped part 34 illustrated separately in FIG. 5 has a central section 50 and two lateral limbs 54, 58, each of which merges into the central section 50 via an intervening curved section 52, 56. The shaped part 34 shown in FIG. 5 has a multiplicity of individual, plastically deformed deformation sections 42, which are arranged in a spaced apart manner, and are formed in the shape of individual bead-type depressions 42 in the region of the central section 50.

Figure 5C:
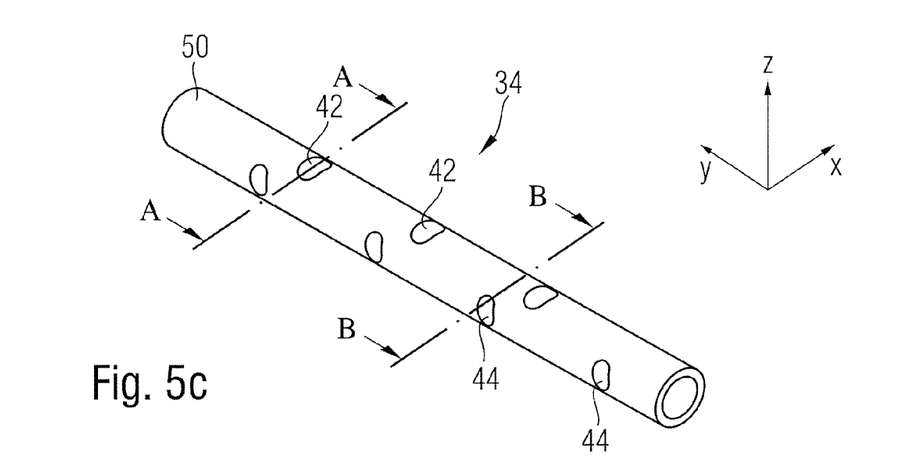
FIG. 5c shows an enlarged representation of a central section of the shaped part shown in FIG. 5.

The deformation sections 42, 44, as shown in the enlarged representation in FIG. 5c, can also be formed in the manner of a notch 42, 44 extending transversely to the longitudinal extent of the central section. In the illustrations in FIGS. 5 and 5c, the individual deformation sections 42, 44 are arranged in a substantially regular manner at an equidistant spacing from one another over the longitudinal extent of the central section 50. The spacing between deformation sections 42, 44, spaced apart in the longitudinal direction, is preferably in the centimeter range.

The spacing between deformation sections 42, 44 spaced apart in the longitudinal direction can be between 0.5 and 5.0 centimeters, preferably between 1 cm and 4 cm, preferably no more than between 2.0 and 3.0 centimeters.

By introducing local deformation sections 42, 44, it is possible to equalize and compensate for restoring forces associated with bending elasticity in the shaped part 34, which is preferably manufactured from a tubular metal blank. In addition to the stamped locations 42, 44 provided in the central section 50, the curved sections 52, 56 adjoining the central section on both sides also have a stamped feature which follows the curvature, as can be seen, for example, from the cross section in FIGS. 2 and 5b.

The curved sections 52, 56 of the shaped part 50 thus have a profile-type cross-sectional geometry which deviates from a circular profile. The cross-sectional profile, comprising, for example, four stamped locations, which are arranged in a manner distributed over the circumference of the curved section 52, 56, extend along the curved section 52, 56, reduce the outside circumference and are oriented radially inwards, can be produced with the required dimensional accuracy by means of the stamping process involving plastic deformation.

In particular, it is found to be advantageous that the shaped part 34 is subjected to a stamping process involving plastic deformation only in a certain section or sections and/or in a certain area or areas, not along its entire longitudinal extent, but precisely in the region of its central section 50. In this way, the feed force of a stamping tool required to bring about a sufficient plastic deformation can be reduced. Moreover, the stamping tool and the pressing or stamping dies need only be designed for these comparatively low feed forces, and this proves advantageous in regards to the production and operating costs and for the handling of the stamping tool.

Figure 6A:
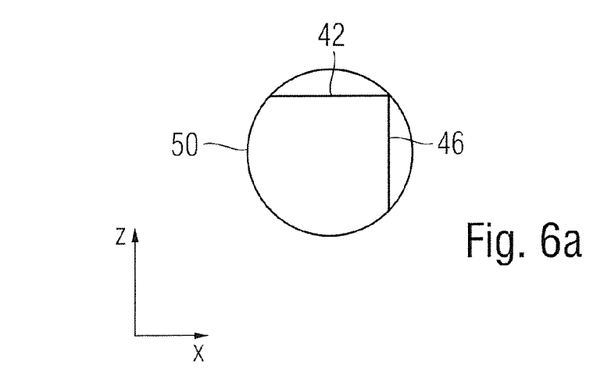
FIG. 6a shows a schematic cross section through the central section of the shaped part along the line of section A-A in FIG. 5c.
Figure 6B:
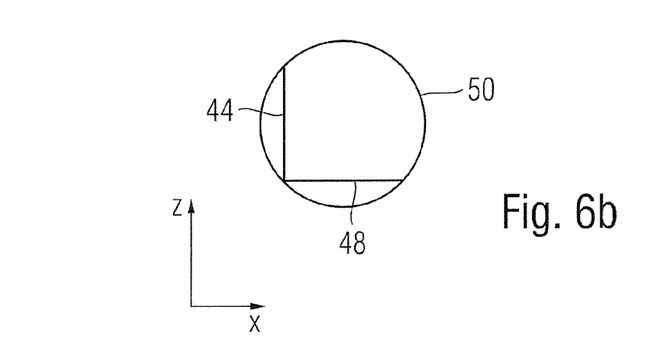
FIG. 6b shows a schematic enlarged representation of the cross section through the central section of the shaped part along the line of section B-B in FIG. 5c.
Figure 7A:
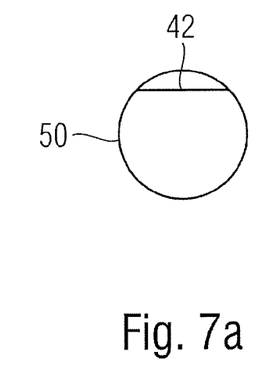
FIGS. 7a-7d show cross sections, spaced apart in the longitudinal direction, of a central section of a shaped part in accordance with another embodiment of the invention.
Figure 7B:
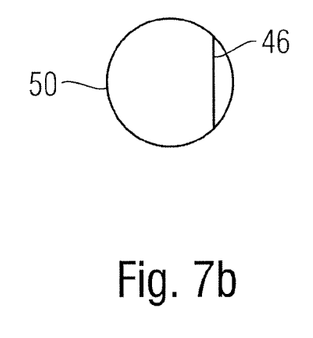
Figure 7C:
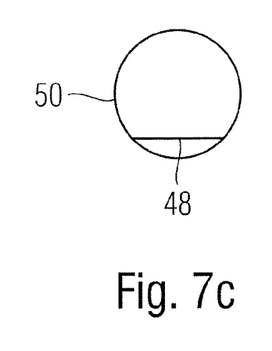
Figure 7D:
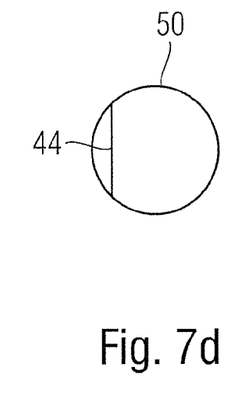

The central section 50 of the shaped structural reinforcing part 34 is illustrated in FIGS. 6a and 6b in two cross sections taken along lines of cross section A-A and B-B, respectively, in FIG. 5c. In the subsequent final installation position in the motor vehicle, the central section 50 extends substantially in the transverse direction "Y" of the vehicle, and the cross sections shown in FIGS. 6a and 6b thus lie on the axis formed by the longitudinal axis "X" of the vehicle and the vertical axis "Z" of the vehicle. The cross section in FIG. 6a shows two bead-type deformation sections 42, 46, deformation section 42 being formed on the upper side and deformation section 46 being formed laterally, from the right, in the central section 50. The two deformation sections 42, 46, which lie in the same plane A-A, directly adjoin one another.

However, it is also possible to provide embodiments in which the plastic deformation sections 42, 46 have a smaller notch depth, with the result being that the bead-type depressions are separate from one another, as seen in the circumferential direction.

In another plane of cross section B-B, as shown in FIG. 6b, two corresponding deformation sections 44, 48 are shown, which are formed laterally from the left and from below, respectively, in the central section 50. Forming deformation sections 42, 44, 46, 48 in alternating pairs in this way makes it possible to introduce the deformation force produced by the stamping tool in a largely uniformly distributed manner into the workpiece, as seen in the circumferential direction of the central section.

FIG. 7 shows another embodiment of possible deformation sections 42, 44, 46, 48 introduced in a bead-like manner into a central section 50. The sequence in FIGS. 7a, 7b, 7c and 7d corresponds to successive individual planes of cross section situated adjacent to one another in the longitudinal direction of the central section 50 and each is provided with beads. The top-side bead 42 shown in FIG. 7a is followed, as seen in the longitudinal direction of the central section, by a lateral bead 46, shown in FIG. 7b, which is followed in turn by a bottom bead 48, shown in FIG. 7c, and a further, lateral bead 44, shown in FIG. 7d. In this embodiment, the individual beads 42, 46, 48, 44 are introduced into the central section in such a way that they run around approximately in the manner of a spiral and are oriented in a manner offset by in each case 90 degrees in the circumferential direction.

Figure 8A:
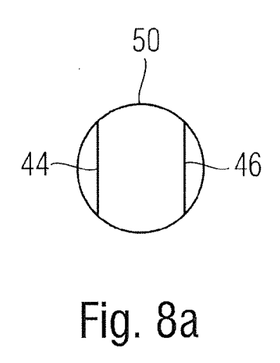
FIGS. 8a-8b show another embodiment of a central section in two cross sections spaced apart in the longitudinal direction.
Figure 8B:
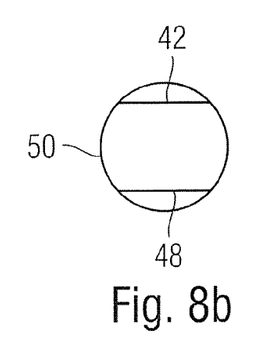

FIGS. 8a and 8b furthermore show another alternative embodiment of bead geometry in two successive cross sections provided with beads. In the cross section shown in FIG. 8a, two opposite lateral beads 44, 46 are pressed into the outer circumference of the tubular central section 50, while a top and a bottom bead 42, 48 are pressed into a cross section of the central section spaced apart therefrom in the longitudinal direction.

In the isolated enlarged representation shown in FIG. 5a, a portion of the shaped structural reinforcing part 34 functions as an insert for the extender 12, and a receiving opening 60 is furthermore provided in the region of the lateral limbs 54, 58. This serves to receive an inserted auxiliary spring 36, as illustrated in FIGS. 3 and 4. In the installation position illustrated in FIG. 4, the spring 36 has an angled fastening section 40 facing the extender 12, whereby the spring 36 can be inserted into the opening 60 provided in the shaped part 34. The opening 60 is preferably introduced into the shaped part 34 or punched out of the latter in the course of the aligning stamping process. Once the aligning stamping process is complete, the spring 36 can be introduced into the insertion opening 60 by way of preassembly before being embedded in the plastic surrounding the shaped part in the subsequent injection-molding process, and thus being fixed on the extender 12.

On its end section facing the base part 14, the spring 36 has a supporting tab 38, by means of which the spring 36 can either be arranged securely on the base part 14 or is supported on the latter. In particular, the auxiliary spring 36 is provided to initiate an extension movement involving swinging the extender 12 upwards. With the aid of the auxiliary spring 36, the opening movement of the extender 12 relative to the base part 14 can be assisted. Thus, the auxiliary spring 36 makes it possible to somewhat reduce the spring force dimensioning of the leg spring 18 arranged between the extender 12 and the base part 14, and this can have an advantageous effect on the mechanical loading of the extender 12 and the base part 14.

The provision of a fastening opening 60 in the shaped structural reinforcing part 34 functioning as an insert has virtually no effect on costs since the punching process provided for the purpose of creating the fastening opening 60 takes place in any case in the course of the stamping process that aligns the shaped part. Moreover, there is no need for a separate fastening element for the final fastening of the auxiliary spring 36. Encapsulating or molding in the spring 36 in a single or multi-component injection-molding process for the formation of the extender 12 and/or the base part 14 means that the installation of the spring 36 on the extender 12 is accomplished without additional assembly steps.

In addition to the mounting of the auxiliary spring 36 on the extender 12, it furthermore proves advantageous that it is also possible, in the course of the aligning stamping process, to connect the leg 30 of the leg spring 18 functioning as a hinge between the extender 12 and the base part 14 directly to the respective lateral limbs 54, 58 of the shaped part 34 functioning as an insert.

The corresponding leg 30 of the leg spring 18 can be introduced, before the aligning stamping process on the shaped part 34, into the open ends of the lateral limbs 54, 58 of the shaped part 34 and can be connected with a clamping action to the free ends of the lateral limbs 54, 58 through appropriate deformation thereof in the course of the stamping process which aligns the shaped part. Supplementary fastening of the leg spring 18 and the extender 12 and/or base part 14 can be accomplished by means of the subsequent injection-molding process.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. In a motor vehicle wind deflector, the improvement comprising:
   a one-piece, structural reinforcing member constructed from a single, elongate piece of metal that is bent into a shaped configuration with at least one curved portion, and includes a plurality of mutually spaced apart, plastically formed deformation sections which provide structural rigidity to maintain said shaped configuration and geometry of said formed reinforcing member; and wherein
   said deformation sections are stamped into said formed reinforcing member to reduce restoration forces therein caused by bending said reinforcing member into said shaped configuration.

2. A motor vehicle wind deflector as set forth in claim 1, wherein:
   said reinforcing member has a central section which extends substantially linearly, and includes said deformation sections disposed generally perpendicularly to the longitudinal extent of said center section to define beads.

3. A motor vehicle wind deflector as set forth in claim 2, wherein:
   said central section merges through said curved portion into at least one lateral limb which extends generally perpendicularly to the longitudinal direction of said central section.

4. A motor vehicle wind deflector as set forth in claim 1, wherein:
   said reinforcing member has a hollow tubular configuration.

5. A motor vehicle wind deflector as set forth in claim 3, wherein:
   at least a portion of said reinforcing member has a non-circular cross-sectional profile.

6. A motor vehicle wind deflector as set forth in claim 1, wherein:
   said reinforcing member is deformed plastically at least in certain areas thereof for the purpose of geometrical adaptation to a predetermined cross-sectional profile.

7. A motor vehicle wind deflector as set forth in claim 3, wherein:
   said lateral limb includes a free end which is oriented away from said central section of said reinforcing member; and including
   a leg spring having a leg operably connected with said free end of said lateral limb by non-positive engagement.

8. A motor vehicle wind deflector as set forth in claim 3, wherein:
   said lateral limb includes an insertion opening facing said curved portion; and including
   an auxiliary spring having a portion thereof received in said insertion opening and configured to assist in adjusting the position of an associated motor vehicle wind deflector.

9. A motor vehicle wind deflector as set forth in claim 2, wherein:
   said deformation sections are disposed adjacent to one another in the longitudinal direction of said central section, and are arranged in a manner distributed over the circumference of said central section.

10. A motor vehicle wind deflector as set forth in claim 1, including:
    a base member and an extender member which are pivotally connected to one another and have a flexible surface member stretched therebetween; and wherein
    at least one of said base member and said extender member incorporates said reinforcing member therein and includes at least portions thereof encapsulated with plastic.

11. A motor vehicle wind deflector, comprising:
    a base member adapted for connection with a motor vehicle;
    an extender member pivotally connected with said base member;
    a surface member stretched between said base member and said extender member; and wherein
    said base member and/or the extender member comprise a structural reinforcing member having a shaped configuration with at least one curved portion and a plurality of mutually spaced apart, plastically formed deformation sections, which provide structural rigidity to maintain said shaped configuration and geometry of said reinforcing member;
    said deformation sections of said structural reinforcing member are stamped into said reinforcing member to reduce restoration forces therein caused by bending the same into said shaped configuration; and
    said structural reinforcing member is encapsulated with plastic at least in a certain area or areas.

12. The motor vehicle wind deflector as set forth in claim 11, further comprising:

an extender spring operably connected with said base member and said extender member, resiliently urging said extender member to an extended position and defining a hinge joint between said base member and said extender member; and an auxiliary spring connected with at least one of said base member and said extender member, and positioned a spaced apart distance from said hinge joint to resiliently urge said extender member toward said extended position.

* * * * *